(12) United States Patent
Castelli et al.

(10) Patent No.: US 9,247,844 B2
(45) Date of Patent: Feb. 2, 2016

(54) INFUSION UNIT WITH VARIABLE VOLUME INFUSION CHAMBER

(75) Inventors: Cristiano Castelli, Eindhoven (NL); Stefano Tonelli, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 184 days.

(21) Appl. No.: 13/698,119

(22) PCT Filed: Jun. 23, 2011

(86) PCT No.: PCT/IB2011/052757
§ 371 (c)(1),
(2), (4) Date: Nov. 15, 2012

(87) PCT Pub. No.: WO2012/001592
PCT Pub. Date: Jan. 5, 2012

(65) Prior Publication Data
US 2013/0087052 A1    Apr. 11, 2013

(30) Foreign Application Priority Data

Jun. 29, 2010   (IT) ................................ FI2010A0139

(51) Int. Cl.
*A47J 31/00* (2006.01)
*A47J 31/36* (2006.01)
*A47J 31/06* (2006.01)

(52) U.S. Cl.
CPC .............. *A47J 31/36* (2013.01); *A47J 31/0647* (2013.01); *A47J 31/0657* (2013.01); *A47J 31/3604* (2013.01); *A47J 31/3614* (2013.01)

(58) Field of Classification Search
CPC .... A47J 31/3614; A47J 31/36; A47J 31/3609
USPC .......................... 99/302 P, 287, 289 R, 302 R
See application file for complete search history.

(56) References Cited

U.S. PATENT DOCUMENTS

| 3,327,614 | A | * | 6/1967 | Bridges et al. .................. 99/283 |
| 4,681,028 | A | | 7/1987 | Schmed et al. |
| 5,911,810 | A | * | 6/1999 | Kawabata ..................... 99/302 P |
| 6,253,664 | B1 | | 7/2001 | Giannelli |
| 6,431,055 | B2 | * | 8/2002 | Bonanno ...................... 99/302 P |
| 7,487,713 | B2 | | 2/2009 | Magno |
| 8,047,127 | B2 | * | 11/2011 | Lin .............................. 99/302 P |

FOREIGN PATENT DOCUMENTS

| EP | 1306041 A1 | 5/2003 |
| EP | 1641371 B1 | 7/2007 |
| WO | 2004112556 A1 | 12/2004 |

* cited by examiner

*Primary Examiner* — Reginald L Alexander (57) ABSTRACT

An infusion unit includes an infusion chamber for coffee or other product where, through water under pressure, flavors are extracted for making a beverage. The infusion chamber includes at least one yielding wall for adjusting a volume of the closed infusion chamber according to the amount of product contained into the infusion chamber. Moreover, a variable volume chamber is provided, which is filled with a liquid and connected to the yielding wall, so that a volume of the variable volume chamber filled with liquid varies according to a position taken by the yielding wall when the infusion chamber is closed. The position of the yielding wall is locked when the infusion chamber is closed, preventing the liquid flow from and into the variable volume chamber filled with liquid.

24 Claims, 7 Drawing Sheets

FIG. 6 ously used for making a portion of espresso coffee. In the most sophisticated automatic machines, the user has the possibility of slightly changing this amount of coffee, to better satisfy his/her taste, for example for having stronger or less strong coffee. However, the range of variation is moderate. Moreover, it is not possible to dispense two coffee cups in a single infusion cycle. It is only possible to select the automatic execution of two infusion cycles in a sequence.

An infusion unit with a variable volume infusion chamber for alternately receiving one or two product pods is described in EP-A-1641371.

SUMMARY OF THE INVENTION

The present invention aims at providing an infusion unit that entirely or in part overcomes at least one of the drawbacks of the traditional units. The object of a preferred embodiment of the invention is to provide an infusion unit that allows varying the volume of the infusion chamber in a relatively high range while keeping the advantages of simplicity, sturdiness and reliability of the traditional infusion units.

Substantially, the invention relates to an infusion unit for the production of hot beverages by extraction of a product charged into an infusion chamber using pressurized hot water, where the infusion chamber comprises at least one yielding wall for adjusting the volume of the closed infusion chamber to the amount of product contained into said infusion chamber. Moreover, a variable volume chamber is provided, filled with a liquid and connected (either directly or indirectly) to the yielding wall, so that the volume of the variable volume chamber filled with liquid varies according to the position taken by the yielding wall when the infusion chamber is closed. The position of the yielding wall is locked when the infusion chamber is closed, preventing the liquid flow from and into said variable volume chamber filled with liquid. In substance, the infusion unit therefore comprises a variable volume infusion chamber that can receive a variable amount of product, for example coffee powder. The yielding wall, for example biased by a compression spring, adjusts for receiving a larger or smaller amount of product, or also for delimiting a chamber with minimum, virtually null volume, when the product is not present therein. This condition can occur, for example, during pre-heating or rinsing of the infusion chamber. The unit further comprises a locking device that prevents further movements of the yielding wall when the closing position has been reached, for preventing variations of the infusion chamber position, that is, volume variations, due to the internal pressure of the infusion chamber. Otherwise, the water pressure could cause the opening of the infusion chamber during the infusion cycle. The locking system or device uses a variable volume chamber filled with liquid, substantially incompressible, wherein the flow into or from the chamber filled with liquid is prevented during the infusion. The non-compressibility of the liquid trapped into the chamber filled with liquid blocks and prevents further deformations of the wall.

The variable volume chamber filled with liquid may be filled with a thermally stable liquid, that is, a liquid having a low thermal expansion coefficient, such as for example a suitable oil. In this case it is advantageous for the variable volume chamber filled with liquid to be a part of a closed circuit, so that the amount of liquid is always the same. The variable volume chamber filled with liquid in this case will advantageously be connected, for example through a flow conduit or passage, with a variable volume tank, for example a collection container, which allows storing a larger or smaller amount of liquid, according to the volume taken by the variable volume chamber filled with liquid once the infusion chamber has reached its closed condition.

The possibility of using an open circuit is not excluded, for example filled with water which may be the same water used also for making the beverage. For example, it is possible to provide for filling the variable volume chamber filled with liquid whenever an infusion cycle must be carried out. This solution, however, currently is less preferred as it requires a larger water consumption.

In some embodiments said infusion chamber comprises an end wall opposing said yielding wall, said end wall being controlled by a closing actuator and moving towards said yielding wall during closure of said infusion chamber.

In some embodiments of the invention, the yielding wall is biased by a resilient member, which can be housed inside the variable volume chamber filled with liquid. The resilient member can bias the yielding wall towards a position of minimum volume of said infusion chamber. During closure of the infusion chamber, the resilient member is compressed allowing the yielding wall to move towards a retracted position, thus reducing the volume of said variable volume chamber filled with liquid. The closing member can be controlled such that when the infusion chamber has achieved its closed position, liquid flow from said variable volume chamber filled with liquid is prevented, such that the volume of the infusion chamber will remain substantially constant during the infusion cycle.

In some embodiments, the closing actuator causing a first portion and a second portion of the infusion chamber to move reciprocally one with respect to the other from an opening position to a closing position and vice-versa. During closing of the infusion chamber, pressure on a product contained therein causes yielding of the yielding wall and consequent reduction of the variable volume chamber filled with liquid until a final closing position is achieved.

The infusion unit according to the invention may be used for making coffee but also other beverages, for example tea, cappuccino, milk with coffee, barley beverages, etc. In general, the invention may be embodied by any infusion unit that requires dispensing hot water at a certain pressure higher than ambient pressure in an infusion chamber for making the beverage where it is useful to vary the volume of the infusion chamber. The invention is preferably applied to infusion units that are fed with loose products, for example coffee powder obtained from the grinding of coffee grains or beans. However, the infusion unit according to the invention may also be designed for receiving capsules, pods, cartridges or other single- or multi-dose product packages. The unit according to the invention allows, for example, alternately using a single package or two overlapped packages. Or, it is possible to use differently sized packages, for example for a single or double beverage dose.

In some embodiments, the infusion chamber comprises the first portion and the second portion, reciprocally moving in relation to each other to take the opening position and the closing position of the infusion chamber.

In some embodiments, the first portion of the infusion chamber is provided with a rotation movement, between a product charging position and a position of alignment with the second portion of the infusion chamber according to an axis, wherealong at least the first portion of the infusion chamber carries out a translation movement for approaching the second portion of the infusion chamber. Moreover, in the closed position of the infusion chamber, the first portion of the infusion chamber preferably is in a position substantially independent of the amount of product charged into said infusion chamber.

In some embodiments of the invention, the infusion unit comprises a support structure whereon the first portion and the second portion of the infusion chamber are supported. The first portion of the infusion chamber for example comprises a first end wall and the second portion of the infusion chamber may comprise a second end wall. Advantageously, when the infusion chamber is in closed position, the end walls delimit a variable infusion volume according to the amount of product used. In some embodiments, one of the end walls constitutes the yielding wall of the infusion chamber. Preferably, such wall is biased by an elastic member, for example a helical compression spring, so that the position of the yielding wall when the infusion chamber is closed varies according to the amount of product in the infusion chamber, the elastic member being deformed according to the amount of product in the infusion volume.

In some embodiments, the portion of the infusion chamber defines a cylindrical volume closed at an end by the first end wall. The second portion of the infusion chamber may advantageously comprise a piston that may be inserted in the cylindrical volume and defining the yielding wall. The reciprocal position of the piston and of the first end wall when the infusion chamber is closed is defined by the amount of product in said infusion chamber.

In some embodiments, the piston is slidingly guided into a sliding seat integral to the second portion of the infusion chamber. Advantageously, the piston is biased by said elastic member and preferably it is guided by a stem into the sliding seat and is biased by the elastic member towards a position of maximum extraction from said sliding seat. In some embodiments, the elastic member is directly arranged into the sliding seat and it preferably surrounds the piston stem which with its head defines the yielding wall. In some embodiments of the invention, the same sliding seat and the piston form the variable volume chamber filled with liquid.

According to another aspect, the invention relates to a beverage production machine comprising an infusion unit ad defined above.

Further advantageous features and embodiments of the invention are described hereunder and are set forth in the appended claims, which form an integral part of the present description.

BRIEF DESCRIPTION OF THE DRAWINGS

The invention will be better understood by following the description and accompanying drawing, which shows a non-limiting practical embodiment of the invention. More in particular, in the drawing.

DETAILED DESCRIPTION OF AN EMBODIMENT OF THE INVENTION

Figure 1:
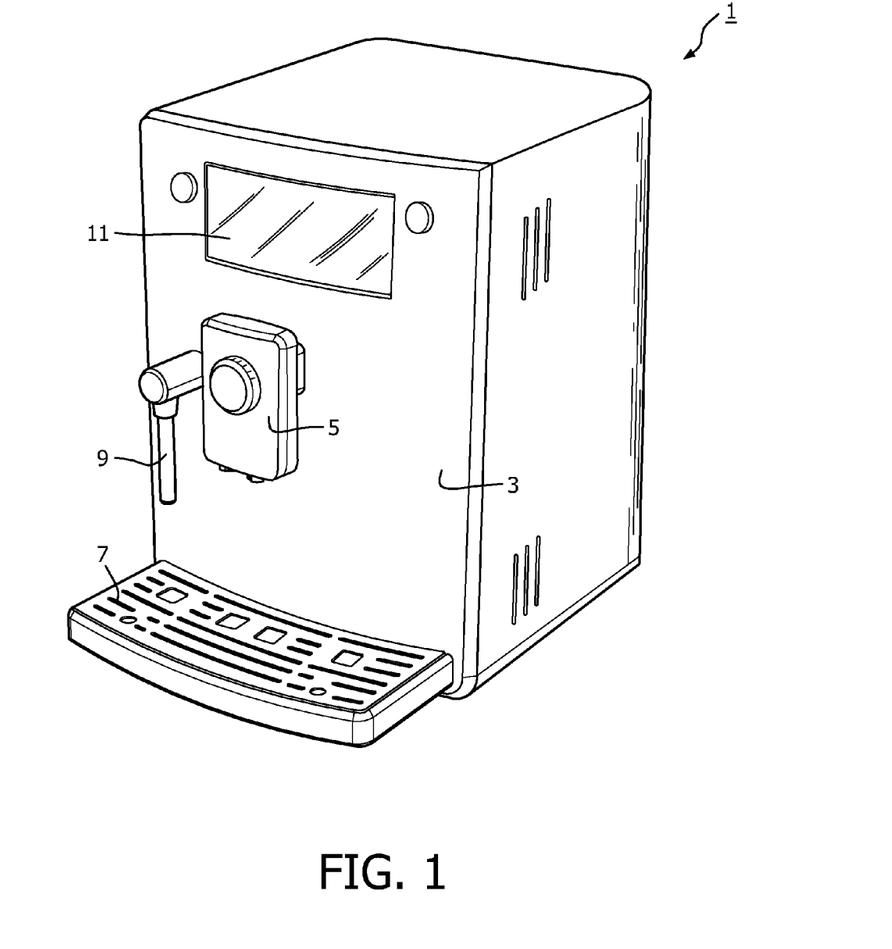
FIG. 1 illustrates a perspective schematic view of an automatic coffee machine for household purpose, wherein an infusion unit according to the invention may be used.

FIG. 1 schematically shows a perspective view of a coffee machine globally indicated with reference numeral 1 wherein an infusion unit according to the invention may be used. The coffee machine 1 has a front wall 3 whereon a dispensing unit 5 is placed whereunder a support surface 7 for coffee cups wherein the beverage is dispensed, is positioned. A dispensing spout 9 is arranged next to the dispensing unit 5 for dispensing steam or hot water. An interface 11 is provided on top of the dispensing unit 5, whereby the user can set the machine controls and receive information from the machine.

Various per se known members are arranged within the housing of machine 1, among which a hydraulic circuit with a pump, a flow meter, and a heater or a boiler for heating the water that is fed at a high pressure by a pump to an infusion unit described hereinafter in detail with reference to FIGS. 2A to 6.

The members of machine 1, except for the infusion unit that shall be described hereinafter in detail, may be made in various ways known to those skilled in the art, and are unimportant for understanding the present invention. Therefore, they shall not be described hereinafter in greater detail. Those skilled in the art may design these components of the coffee machine 1 based on their experience and on the prior art.

FIGS. 2A to 6 show the infusion unit of the invention in detail and in various sections and various operating positions in a possible embodiment.

The infusion unit is globally indicated with reference numeral 21. It comprises a structure 23 that may be formed by one or more parts that are coupled or may be coupled. Structure 23 may be integrally or only partially extractable from the housing of the machine 1.

Structure 23 is connected to a first portion 25 of an infusion chamber. Portion 25 comprises a cylindrical body 27 wherein a piston 29 slides, forming a first end wall for closing the infusion volume defined by the first portion 25 and by a second portion 31 of the infusion chamber. Portions 25 and 31 are movable relative to one another with a movement that shall be described hereinafter with reference to FIGS. 2A to 5A.

The second portion 31 of the infusion chamber comprises a piston 33 forming a second end wall defining the infusion volume. Piston 33 comprises a seal 35 for sealing on the inner cylindrical surface of the cylindrical wall 27 and is associated to a stem 37 sliding within a sliding seat 39 provided in a block 41 which, in the example shown, is integral to structure 23.

Stem 37 is internally hollow and defines an outlet conduit 43 for the coffee beverage obtained by the extraction of flavours from the coffee powder inserted in the infusion volume, through the hot water under pressure fed to the infusion chamber. The infusion water is fed to the infusion chamber through a conduit 29A provided in the stem of piston 29. At the end of conduit 43 there is arranged an adjustable counter-pressure valve 45, for example made according to what described in U.S. Pat. No. 6,382,083.

Within seat 39 and around stem 37 there is arranged a helical compression spring 47 that reacts between an annular stop 41A of block 41 and a collar 37A provided on stem 37. Adjacent collar 37A there is provided an annular seat 37B for a seal 37C.

The free volume within seat 39, wherein stem 37 of piston 33 can slide, defines a variable volume fluid chamber 49, filled with a substantially non-compressible fluid, that is, in the practice, with a liquid, for the purposes described below. As is visible in particular in the section of FIG. 6, in this embodiment the fluid chamber 49, delimited by stem 37 and by seat 39, wherein also the compression spring 47 is seated, is in fluid connection with a collection container 51. In this embodiment, unit 51 is formed in a cylindrical body 53 wherein a piston 55 is seated which divides the inside volume of cylinder 53 into an outer chamber, filled with air an in connection with the environment, and into an inner chamber forming the actual unit 51. Unit 51 is in fluid connection with chamber 49 through a passage 59 and a passage 61. A solenoid valve 63 is arranged so as to selectively open and close the connection between passages 59 and 61. Through the opening and closing of solenoid valve 63 it is possible to set the fluid chamber 49 in communication with unit 51 or isolate it therefrom.

The operation of the infusion unit briefly described so far shall be illustrated in detail hereinafter with reference to the sequence of FIGS. 2A-5A and 2B-5B.

Figure 2A:
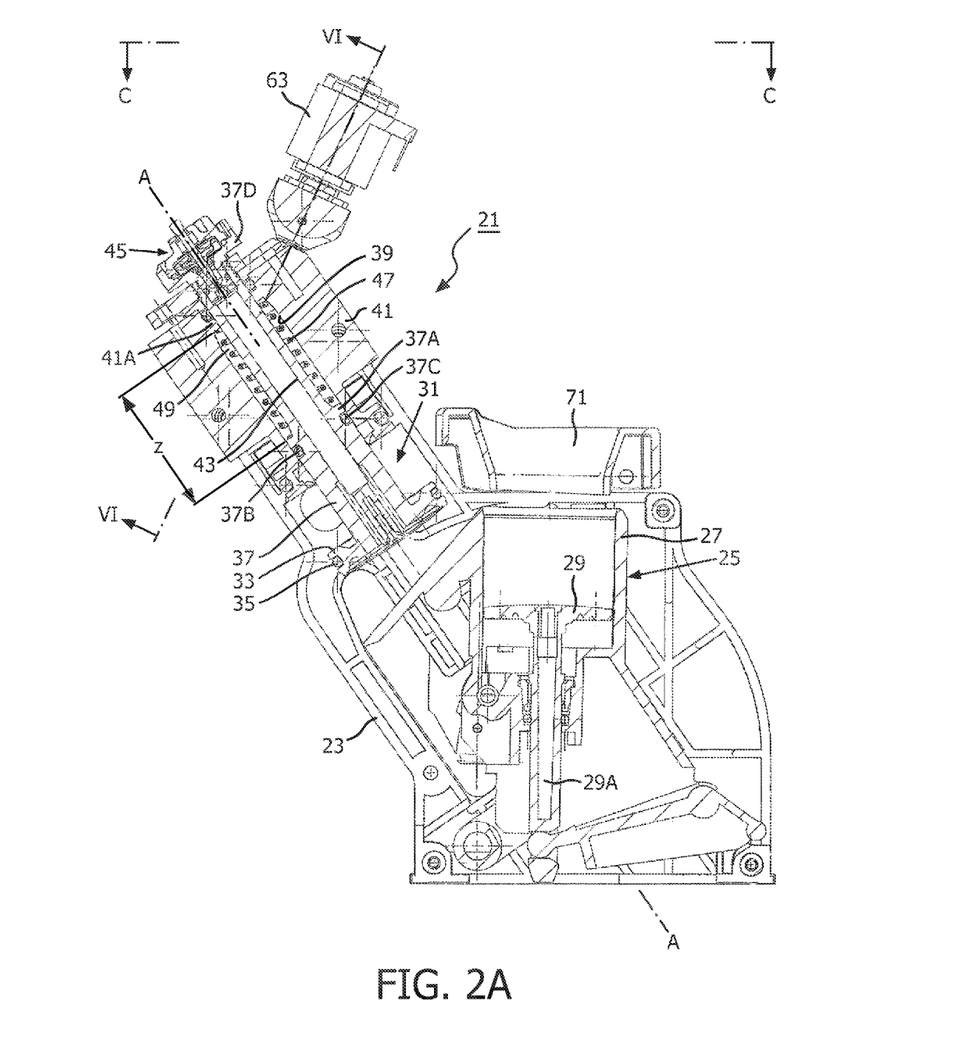
FIG. 2A illustrates a section according to line A-A of FIG. 2C, in a vertical plane of the infusion unit according to the invention in a possible embodiment.
Figure 2B:
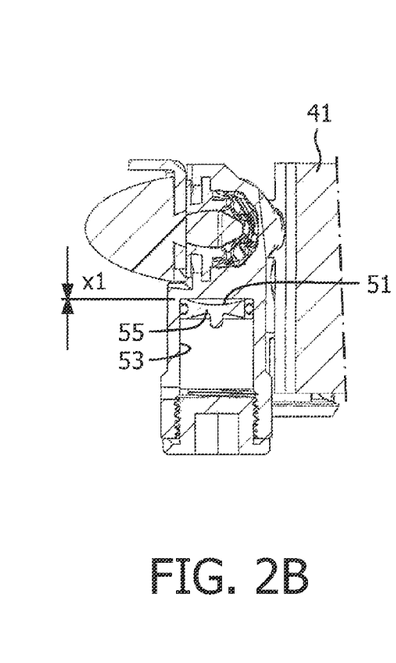
FIG. 2B illustrates a section according to line B-B of FIG. 2C.
Figure 2C:
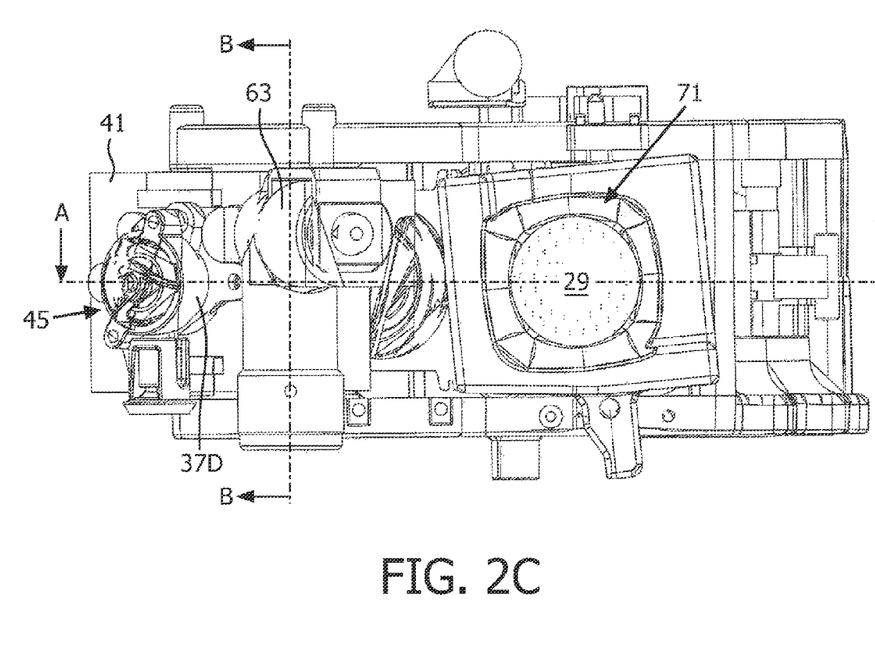
FIG. 2C illustrates a plan view according to line C-C of FIG. 3A.

In FIG. 2A, the infusion unit 21 is fully open and the first portion 25 is aligned with a hopper 71 wherethrough the coffee powder produced by an overlying coffee grinder (not shown and per se known) is discharged within the volume defined by the cylindrical wall 27 and by the first end wall formed by piston 29 which, in this condition, is in a lowered position within the cylindrical volume defined by the cylindrical wall 27. In other embodiments, not shown, there may be provided means for introducing a coffee package, for example a capsule or a pod, or a pair of capsules or pods, into the infusion chamber.

In this operative condition, the second portion 31 of the infusion chamber is in a position defined by an end abutment 37D of stem 37. Piston 33 is pushed by the compression spring 47 in the position of minimum distance from the first portion 25 of the infusion chamber.

Figures 3A, 3B:
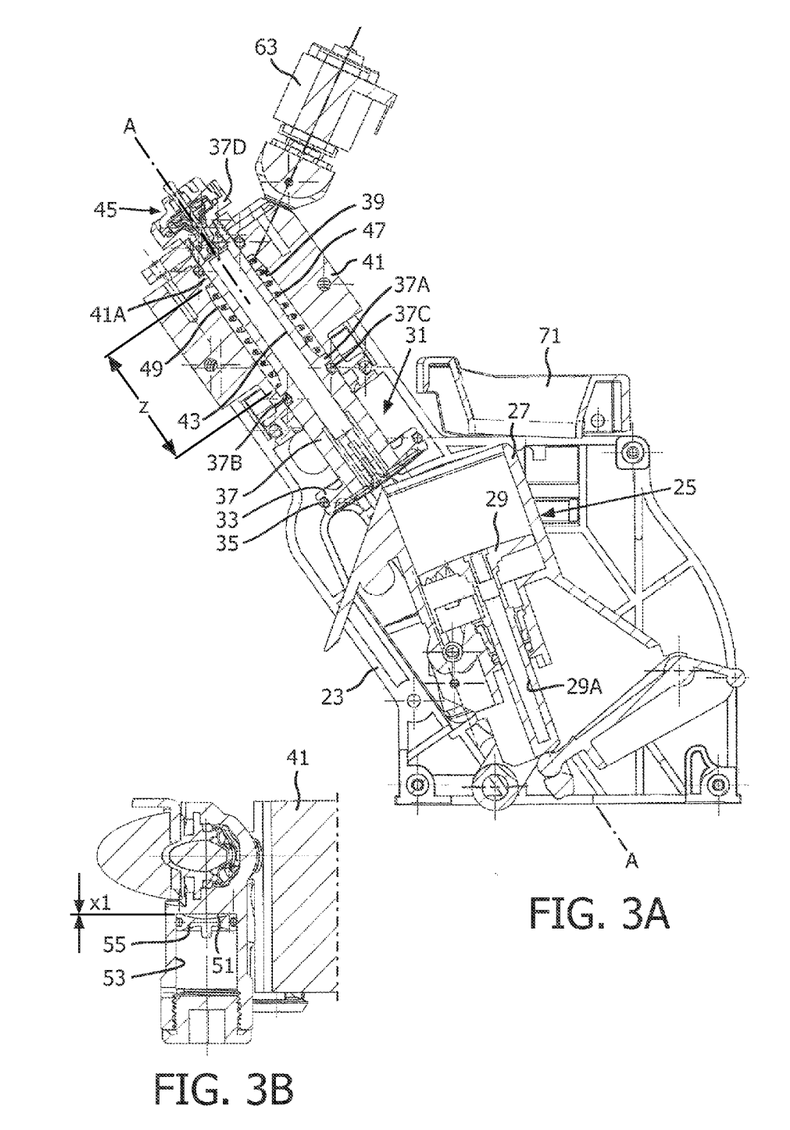
FIGS. 3A, 4A and 5A illustrate sections similar to the section of FIG. 2A in different positions of the infusion chamber.
FIGS. 3B, 4B, 5B illustrate sections corresponding to the section of FIG. 2B in the different operating conditions corresponding to FIGS. 3A, 4A and 5A.

In FIG. 3A the infusion unit 31 is shown in an intermediate step of the closing movement. Portion 31 of the infusion chamber has not undergone any variations, whereas portion 25 has started moving with a rotation movement towards a position wherein it is to be aligned with the second portion 31 according to an alignment axis A-A. The movement is imparted by a motor or other suitable actuator per se known housed in machine 1 and not shown.

Figures 4A, 4B:
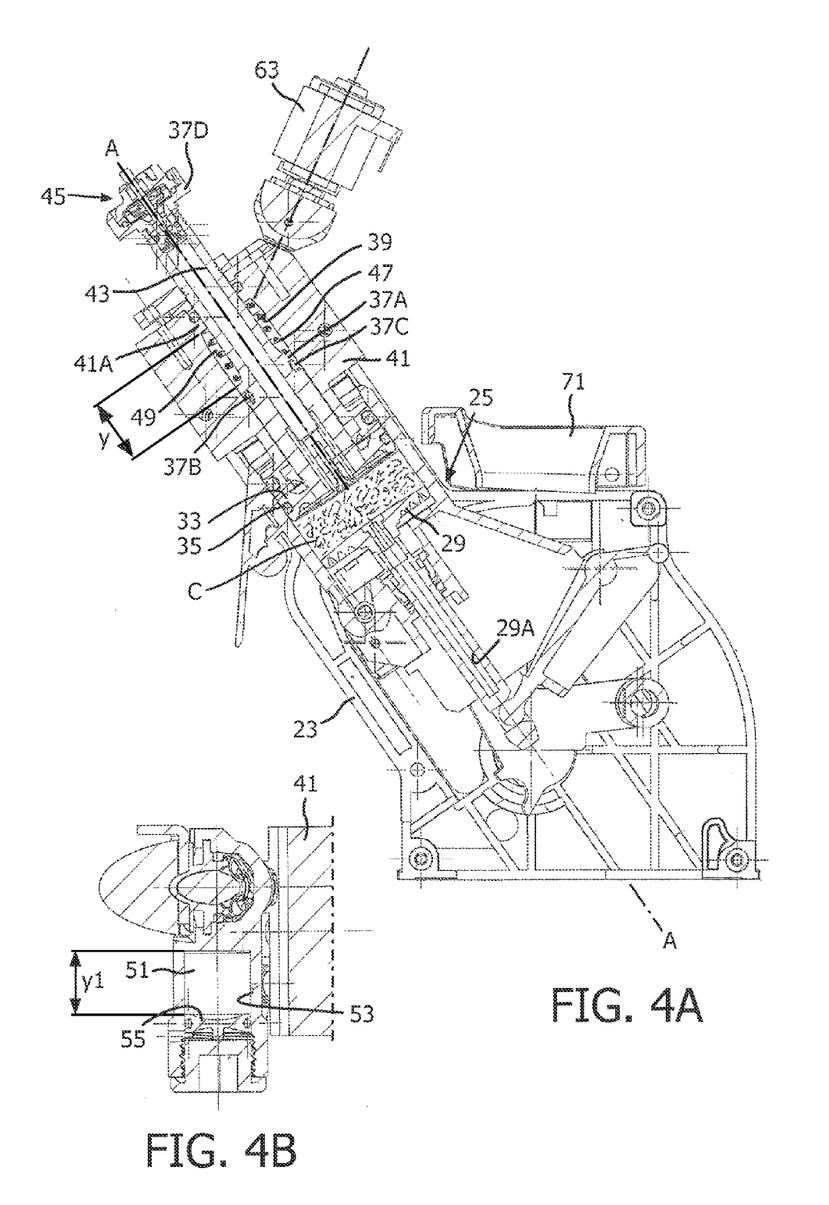

FIG. 4A shows the final position taken by the two portions 31 and 25 of the infusion chamber. The two portions are axially aligned along axis A-A. The bottom portion 25 has completed its rotation movement (in counter clockwise direction in the example) and upward sliding, that is, towards portion 31. This reciprocal sliding movement occurs along the direction defined by axis A-A and allows the penetration of piston 33 of portion 31 in the cylindrical chamber or cylindrical volume defined by the cylindrical wall 27.

Piston 33 of portion 31 has inserted into the cylindrical volume defined by the cylindrical wall 27 so that in a substantially cylindrical volume delimited by the cylindrical wall 27 and by the two end walls formed by piston 29 and by piston 33, a coffee dose C is compressed with a certain pressure given by the compression spring 47. By the effect of the thrust on piston 33 due to the closing movement of the infusion chamber, the compression spring 47 has compressed within seat 39. The presence of spring 47 and the possibility of sliding of stem 37 with piston 33 within seat 39 against the force of the compression spring 47 allows the infusion chamber to reach the final position of FIG. 4A with a variable amount of coffee powder C. The operating condition depicted in FIG. 4A shows the position of the infusion chamber with the maximum possible amount of coffee charged into the infusion chamber volume. This amount can correspond for example to a double espresso coffee.

The rotation and translation movement of components 27, 29 of the bottom portion 25 of the infusion chamber is such that the final position taken by these components preferably is always the same, irrespective of the amount of coffee C present in the infusion chamber. The travel end and closing position of the infusion chamber is defined so that the stresses exerted on the bottom moving wall formed by piston 29, which are generated by the effect of the water under pressure fed into the infusion chamber, do not generate a rotation torque on the actuating shaft of the infusion unit, or in any case generates a very limited torque.

During the closing movement of the infusion chamber from the condition shown in FIG. 2A to the condition shown FIG. 4A, the solenoid valve 63 has kept open the connection through passages 59 and 61 between the fluid chamber 49 and the variable volume collection container 51. As a consequence, as may be seen comparing FIGS. 2B, 3B and 4B, a part of an incompressible fluid, for example a thermally stable oil with a low expansion coefficient, which fills the fluid chamber 49 has partly transferred within the variable volume collection container 51, subsequent to the reduction of volume of the fluid chamber 49 caused by the rise of stem 37 during the closure of the infusion chamber.

Once the condition of FIG. 4A has been reached, the infusion cycle may start. For the water pressure within the infusion chamber not to cause a further compression of spring 47, the solenoid valve 63 is closed. As a consequence, the volume of the fluid chamber 49 becomes invariable since the liquid filling it is substantially incompressible and does not exit through passages 51 and 59 anymore. Piston 33 therefore remains in this position also under the thrust of water under pressure.

Water is introduced into the infusion chamber through a conduit 71 provided in a stem 73 that carries piston 29 defining the bottom end wall of portion 25 of the infusion chamber. The coffee beverage generated by the extraction of the coffee powder through water under pressure comes out of conduit 43 through valve 45 and finally along a tube connected to the dispensing unit 5 and not shown, which fits on a union 75 (FIG. 2C) associated to the counter pressure valve 45. The connecting tube of union 75 to the infusion unit 5 is advantageously flexible for allowing the counter pressure valve 45, integral to stem 37, to take a variable position according to the position of piston 33 when the infusion chamber is closed.

FIG. 4A shows a condition wherein piston 33 actually is in the maximum raised position. In this condition, the closure of the solenoid valve 63 would be useless, since piston 33 cannot retract beyond the position shown here. However, in a condition wherein the amount of coffee C in the infusion chamber is smaller, piston 33 would be less retracted and stem 37 would be able to further slide within seat 39 compressing the compression spring 47 further, under the thrust of water under pressure fed to the infusion chamber. The closing of the solenoid valve 63 prevents this from happening, preventing an expansion of the infusion chamber during the dispensing of infusion water.

Figures 5A, 5B:
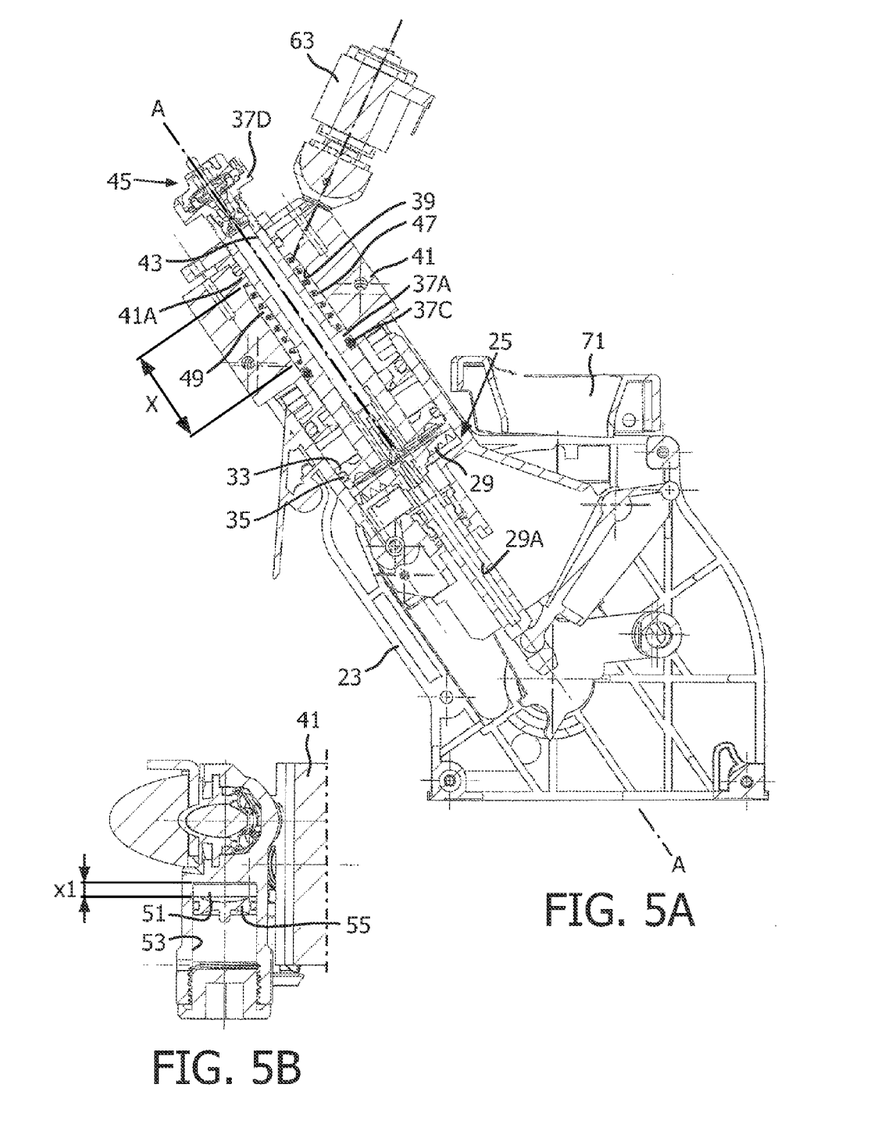
Figure 6:
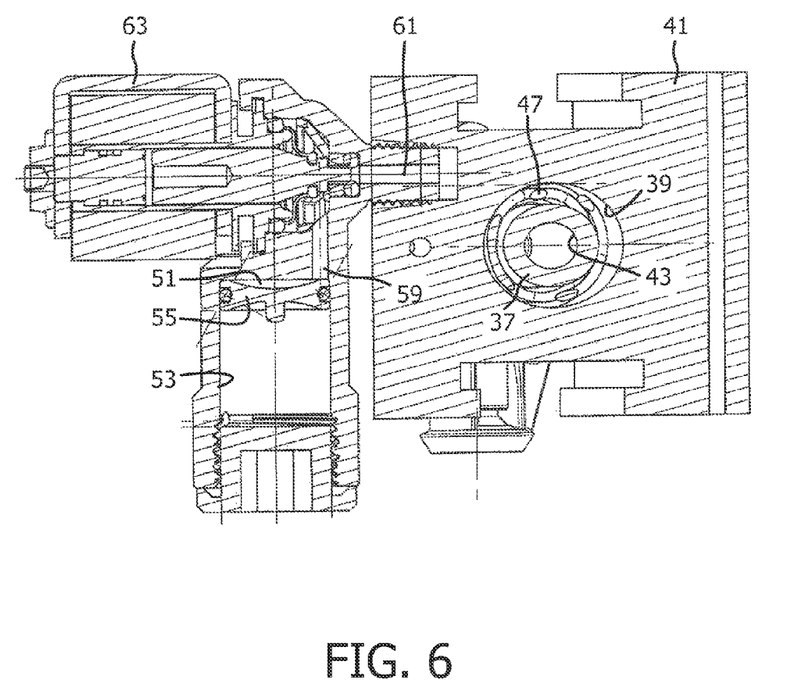
FIG. 6 illustrate a section according to VI-VI of FIG. 2A.

FIG. 5A shows a situation where the infusion chamber has been closed with no coffee therein. This condition is reached by the infusion unit for example in the rinsing or pre-heating steps. In these steps it is necessary to have water flow at a sufficient pressure along the entire hydraulic circuit from the water heater (not shown) up to the dispensing unit 5. In this case it is seen that the position of piston 33 and of the relevant stem 37 is totally different from that shown in FIG. 4A: the compression spring 47 is less compressed and piston 33 is much more protruding inside the cylindrical volume of the infusion chamber surrounded by the cylindrical wall 27. In this case, the closing of the solenoid valve 63 prevents the rise of piston 33 under the thrust of water under pressure. The volume of the infusion chamber is virtually null. As a consequence, at the end of the rinsing or pre-heating cycle the amount of water into the infusion chamber zone is minimal, and in any case much less than what happens in traditional units, where the volume of the infusion chamber during rinsing or pre-heating is equal to the volume of the infusion chamber during the production of coffee. Lower water consumption, electrical energy saving and a reduction of the water discharged into the machine collecting tank, which must be periodically emptied, are thus obtained.

The opening and closing of the solenoid valve may be controlled by a micro-switch that reads the travel end position reached by portion 25 of the infusion chamber. As already said before, this position does not change, that is, it substantially is always the same irrespective of the contents of the infusion chamber. This final position is defined by structural considerations. In other embodiments an encoder may be provided, that causes the movement carried out by the shaft that actuates the infusion unit.

In the closed position, portion 25 of the infusion chamber takes on such position that the entire pressure exerted by the water fed to the infusion chamber is discharged onto structure 23 without generating a torque or in any case, generating a moderate torque on the driving shaft wherewith the opening and closing movement of the chamber is controlled.

In the example shown, wherein the solenoid valve 63 is provided, the latter may be closed by a micro-switch controlled for example by the driving shaft that closes the infusion chamber, or directly by the moving portion 25 of the infusion chamber, when the latter reaches the final closed position. In other embodiments, rather than a solenoid valve 63, it is possible to provide for a simple mechanical valve directly actuated by a cam on the driving shaft controlling the opening and closing of the infusion chamber, or by the moving portion 25 of the same chamber. In general, closing of the fluid passage between the fluid chamber 49 and the variable volume collection container 51 may be obtained in any way depending on the achievement of the final position by portion 25 of the infusion chamber.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:

1. An infusion unit for production of hot beverages by extraction of a product charged into an infusion chamber using pressurized hot water, comprising said infusion chamber, wherein said infusion chamber comprises:
   a yielding wall configured to take a position by adjusting a volume of the infusion chamber according to an amount of product contained in said infusion chamber when the infusion chamber is closed;
   a variable volume chamber filled with a liquid and connected to said yielding wall, so that a volume of the variable volume chamber filled with the liquid varies according to the position taken by said yielding wall when the infusion chamber is closed; and
   a closing member configured to prevent liquid flow from and in said variable volume chamber filled with the liquid when the position of the yielding wall is locked, the position of the yielding wall being locked when the infusion chamber is closed,
   wherein said variable volume chamber filled with the liquid is in fluid communication with a flow passage from which said liquid can exit from said variable volume chamber, said closing member being provided on said flow passage, and
   wherein said variable volume chamber filled with the liquid is in fluid communication through said flow passage with a collection container, wherein said collection container allows storing a larger or smaller amount of liquid according to the volume of the variable volume chamber filled with the liquid when the infusion chamber is closed.

2. The infusion unit according to claim 1, wherein said infusion chamber further comprises an end wall opposing said yielding wall, said end wall being controlled by a closing actuator and moving towards said yielding wall during closure of said infusion chamber.

3. The infusion unit according to claim 1, wherein said yielding wall is biased by a resilient member towards a position of minimum volume of said infusion chamber; and wherein during closure of said infusion chamber, said resilient member is compressed allowing the yielding wall to move towards a retracted position, reducing the volume of said variable volume chamber filled with the liquid.

4. The infusion unit according to claim 3, wherein said resilient member is a compression spring.

5. The infusion unit according to claim 3, wherein said resilient member is arranged in said variable volume chamber filled with the liquid.

6. The infusion unit according to claim 1, wherein said infusion chamber further comprises a first portion and a second portion, reciprocally moving in relation to each other to take an opening position and a closing position of said infusion chamber, wherein the closing position is when the infusion chamber is closed.

7. The infusion chamber according to claim 6, further comprising a closing actuator causing said first portion and said second portion to move reciprocally one with respect to the other between said opening position and said closing position, and wherein during closing of said infusion chamber, pressure on the product contained therein causes yielding of said yielding wall and a consequent reduction of the volume of the variable volume chamber filled with the liquid until the position of the yielding wall is locked in the closed position.

8. The infusion unit according to claim 6, wherein at least said first portion of the infusion chamber is provided with a rotation movement, between a product charging position and a position of alignment with the second portion of the infusion chamber according to an axis, where along said axis at least said first portion of the infusion chamber carries out a translation movement for approaching said second portion of the infusion chamber; and wherein in said closed position of the infusion chamber the first portion of the infusion chamber is in a position substantially independent of the amount of product charged in said infusion chamber.

9. The infusion unit according to claim 6, further comprising a support structure whereto said first portion and said second portion of the infusion chamber are constrained; wherein said first portion of the infusion chamber comprises a first end wall and said second portion of the infusion chamber comprises a second end wall; and wherein at least one of said first end wall and said second end wall constitutes said yielding wall, which is biased by an elastic member so that the position of said yielding wall when the infusion chamber is closed varies according to the amount of product in the infusion chamber.

10. The infusion unit according to claim 9, wherein the yielding wall is the second end wall.

11. The infusion unit according to claim 6, wherein said first portion of the infusion chamber defines a cylindrical volume; and wherein said second portion of the infusion chamber comprises a piston insertable in said cylindrical volume and defining said yielding wall.

12. The infusion unit according to claim 11, wherein said piston is slidably guided into a sliding seat integral to said second portion of the infusion chamber.

13. The infusion unit according to claim 12, wherein said piston is biased by an elastic member.

14. The infusion unit according to claim 12, wherein said piston is guided by a stem in said sliding seat and is biased by said elastic member towards a maximum extraction position from said sliding seat.

15. The infusion unit according to claim 14, wherein said elastic member is arranged in said sliding seat and surrounds said stem.

16. The infusion unit according to claim 14, wherein the sliding seat and the piston form said variable volume chamber filled with the liquid.

17. The infusion unit according to claim 16, wherein said variable volume chamber filled with the liquid comprises a passage for inlet and outlet of said liquid, and wherein the closing member closes said passage when the infusion chamber is in the closed position.

18. The infusion unit according to claim 1, further comprising a resilient member, wherein in the closed position a pressure from an amount of product contained in the infusion chamber causes the resilient member to be compressed allowing the yielding wall to move upwards in a direction away from a base of the infusion unit and consequently reducing the volume of the variable volume chamber filled with the liquid in the closed position.

19. A machine for preparing a beverage comprising an infusion chamber, wherein the infusion chamber comprises:
   a yielding wall configured to take a position by adjusting a volume of the infusion chamber according to an amount of product contained in said infusion chamber when the infusion chamber is closed;
   a variable volume chamber filled with a liquid and connected to said yielding wall, so that a volume of the variable volume chamber filled with the liquid varies according to the position taken by said yielding wall when the infusion chamber is closed; and
   a closing member configured to prevent liquid flow from and in said variable volume chamber filled with the liquid when the position of the yielding wall is locked, the position of the yielding wall being locked when the infusion chamber is closed,
   wherein said variable volume chamber filled with the liquid is in fluid communication with a flow passage from which said liquid can exit from said variable volume chamber, said closing member being provided on said flow passage, and
   wherein said variable volume chamber filled with the liquid is in fluid communication through said flow passage with a collection container, wherein said collection container allows storing a larger or smaller amount of liquid according to the volume of the variable volume chamber filled with the liquid when the infusion chamber is closed.

20. An infusion unit for production of hot beverages by extraction of a product charged into an infusion chamber using pressurized hot water, comprising said infusion chamber, wherein said infusion chamber comprises:
   a first portion;
   a second portion,
   wherein said first portion being movable in relation to said second portion between an open position and a closed position of said infusion chamber,
   wherein the open position is a product charging position, the product being charged in said first portion, and
   wherein the closed position is a position of alignment with the second portion of the infusion chamber according to an axis;
   a yielding wall configured to take a position by adjusting a volume of the infusion chamber according to an amount of product contained in said infusion chamber when the infusion chamber is in the closed position; and a variable volume chamber filled with a liquid connected to said yielding wall, so that a volume of the variable volume chamber filled with the liquid varies according to the position taken by said yielding wall when the infusion chamber is in said closed position, wherein said variable volume chamber filled with the liquid comprises a passage, for inlet and outlet of said liquid, and wherein a closing member closes said passage when the infusion chamber is in the closed position.

21. The infusion unit according to claim 20, further comprising a resilient member arranged in said variable volume chamber filled with the liquid, wherein said resilient member biases said yielding wall, and wherein the volume of the variable volume chamber filled with the liquid is reduced as the infusion chamber approaches said closed position.

22. An infusion unit for production of hot beverages by extraction of a product charged into an infusion chamber using pressurized hot water, comprising said infusion chamber, wherein said infusion chamber comprises:

a first portion;

a second portion, wherein said first portion being movable in relation to said second portion between an open position and a closed position of said infusion chamber, wherein the open position is a product charging position, the product being charged in said first portion, and wherein the closed position is a position of alignment with the second portion of the infusion chamber according to an axis;

a yielding wall configured to take a position by adjusting a volume of the infusion chamber according to an amount of product contained in said infusion chamber when the infusion chamber is in the closed position; and a variable volume chamber filled with a liquid connected to said yielding wall, so that a volume of the variable volume chamber filled with the liquid varies according to the position taken by said yielding wall when the infusion chamber is in said closed position, wherein said first portion of the infusion chamber is provided with a rotation movement, between the product charging position and the position of alignment with the second portion of the infusion chamber, wherein said first portion of the infusion chamber carries out a translation movement along said axis for approaching said second portion of the infusion chamber; and wherein in said closed position of the infusion chamber the first portion of the infusion chamber is in a position substantially independent of the amount of product charged in said infusion chamber.

23. An infusion unit for production of hot beverages by extraction of a product charged into an infusion chamber using pressurized hot water, comprising said infusion chamber, wherein said infusion chamber comprises:

a yielding wall configured to take a position by adjusting a volume of the infusion chamber according to an amount of product contained in said infusion chamber when the infusion chamber is closed;

a variable volume chamber filled with a liquid connected to said yielding wall, so that a volume of the variable volume chamber filled with the liquid varies according to the position taken by said yielding wall when the infusion chamber is closed; and a resilient member arranged in said variable volume chamber filled with the liquid, wherein said yielding wall is biased by the resilient member towards a position of minimum volume of said infusion chamber; and wherein during closure of said infusion chamber, said resilient member is compressed allowing the yielding wall to move towards a retracted position, reducing the volume of said variable volume chamber filled with the liquid.

24. The infusion unit according to claim 23, further comprising a closing member provided for preventing liquid flow from and in said variable volume chamber filled with the liquid when the position of the yielding wall is locked, the position of the yielding wall being locked when the infusion chamber is closed.

* * * * *